United States Patent
Zelazo et al.

(10) Patent No.: US 7,039,665 B2
(45) Date of Patent: May 2, 2006

(54) EFFICIENT RECONSTRUCTION

(75) Inventors: Daniel L. Zelazo, Kasiwa (JP); Steven D. Trautman, Tsukuba (JP)

(73) Assignee: Texas Instruments Incorporated, Dallas, TX (US)

( * ) Notice: Subject to any disclaimer, the term of this patent is extended or adjusted under 35 U.S.C. 154(b) by 596 days.

(21) Appl. No.: 10/259,676

(22) Filed: Sep. 27, 2002

(65) Prior Publication Data

US 2004/0064492 A1    Apr. 1, 2004

(51) Int. Cl.
*G06F 17/10* (2006.01)
(52) U.S. Cl. ...................................... 708/300
(58) Field of Classification Search ............... 708/300
See application file for complete search history.

(56) References Cited

U.S. PATENT DOCUMENTS

| 4,799,179 | A | * | 1/1989 | Masson et al. | 708/313 |
| 4,868,773 | A | * | 9/1989 | Coyle et al. | 708/304 |
| 2002/0152250 | A1 | * | 10/2002 | Staszewski | 708/319 |
| 2005/0256915 | A1 | * | 11/2005 | McGrath et al. | 708/315 |

* cited by examiner

*Primary Examiner*—Tan V. Mai
(74) *Attorney, Agent, or Firm*—Carlton H. Hoel; W. James Brady; Frederick J. Telecky, Jr.

(57) ABSTRACT

Efficient reconstruction of a discrete signal in a range from subband coefficients of multirate analysis filtering translates the range into required input coefficient ranges and minimizes computation and memory access.

7 Claims, 8 Drawing Sheets

One-dimensional half-band tree for four octaves

Cancel aliasing: $H_0(-z)G_0(z) + H_1(-z)G_1(z) = 0$
Reconstruction: $H_0(z)G_0(z) + H_1(z)G_1(z) = 2z^{-m}$

| n | 0 | 0 | 0 | 0 | x[0] | x[1] | x[2] | x[3] | x[4] | x[5] | x[6] | x[7] | x[8] | x[9] | 0 | 0 | 0 | 0 |
|---|---|---|---|---|---|---|---|---|---|---|---|---|---|---|---|---|---|---|
| 0 | h[4] | h[3] | h[2] | h[1] | h[0] | | | | | | | | | | | | | |
| 1 | | h[4] | h[3] | h[2] | h[1] | h[0] | | | | | | | | | | | | |
| 2 | | | h[4] | h[3] | h[2] | h[1] | h[0] | | | | | | | | | | | |
| 3 | | | | h[4] | h[3] | h[2] | h[1] | h[0] | | | | | | | | | | |
| 4 | | | | | h[4] | h[3] | h[2] | h[1] | h[0] | | | | | | | | | |
| 5 | | | | | | h[4] | h[3] | h[2] | h[1] | h[0] | | | | | | | | |
| 6 | | | | | | | h[4] | h[3] | h[2] | h[1] | h[0] | | | | | | | |
| 7 | | | | | | | | h[4] | h[3] | h[2] | h[1] | h[0] | | | | | | |
| 8 | | | | | | | | | h[4] | h[3] | h[2] | h[1] | h[0] | | | | | |
| 9 | | | | | | | | | | h[4] | h[3] | h[2] | h[1] | h[0] | | | | |
| 10 | | | | | | | | | | | h[4] | h[3] | h[2] | h[1] | h[0] | | | |
| 11 | | | | | | | | | | | | h[4] | h[3] | h[2] | h[1] | h[0] | | |
| 12 | | | | | | | | | | | | | h[4] | h[3] | h[2] | h[1] | h[0] | |
| 13 | | | | | | | | | | | | | | h[4] | h[3] | h[2] | h[1] | h[0] |

Figure 4. Graphical representation of a Convolution.

| n | x[0] | x[1] | x[2] | x[3] | x[4] | x[5] | x[6] | x[7] | x[8] | x[9] |
|---|---|---|---|---|---|---|---|---|---|---|
| 0 | h[0] | | | | | | | | | |
| 1 | h[1] | | | | | | | | | |
| 2 | h[2] | h[0] | | | | | | | | |
| 3 | h[3] | h[1] | | | | | | | | |
| 4 | h[4] | h[2] | h[0] | | | | | | | |
| 5 | | h[3] | h[1] | | | | | | | |
| 6 | | h[4] | h[2] | h[0] | | | | | | |
| 7 | | | h[3] | h[1] | | | | | | |
| 8 | | | h[4] | h[2] | h[0] | | | | | |
| 9 | | | | h[3] | h[1] | | | | | |
| 10 | | | | h[4] | h[2] | h[0] | | | | |
| 11 | | | | | h[3] | h[1] | | | | |
| 12 | | | | | h[4] | h[2] | h[0] | | | |
| 13 | | | | | | h[3] | h[1] | | | |
| 14 | | | | | | h[4] | h[2] | h[0] | | |
| 15 | | | | | | | h[3] | h[1] | | |
| 16 | | | | | | | h[4] | h[2] | h[0] | |
| 17 | | | | | | | | h[3] | h[1] | |
| 18 | | | | | | | | h[4] | h[2] | h[0] |
| 19 | | | | | | | | | h[3] | h[1] |
| 20 | | | | | | | | | h[4] | h[2] |
| 21 | | | | | | | | | | h[3] |
| 22 | | | | | | | | | | h[4] |

Figure 5. Graphical representation of equation 9. Note double shift in columns due to interpolator.

EFFICIENT RECONSTRUCTION

BACKGROUND OF THE INVENTION

The present invention relates to digital filtering, and more particularly, to multi-rate sub-band analysis and synthesis.

Multirate filter banks are used to decompose a signal into multiple sub-bands. The subband coefficients are calculated through successive iterations of the convolution and decimation operators. Various subband decompositions can be obtained by varying the decomposition tree structure; for example, FIGS. 2a–2c illustrate some tree structures: FIG. 2a shows a two-channel full tree of two levels, FIG. 2b has a combination of two-channel, three-channel and four-channel branchings, and FIG. 2c is a one-dimensional half-band analysis tree as used in a discrete wavelet transform: $h_0$ is the lowpass (scaling function) analysis filter, $h_1$ the highpass (wavelet) analysis filter, and $\downarrow 2$ represents decimation (subsampling) by a factor of 2. The input signal s(t) is transformed into wavelet coefficients S(j,w). For two-dimensional images, the wavelet decomposition may use a one-dimensional half-band decomposition in each dimension to yield a four-channel decomposition at each level; the lowpass-lowpass channel is decomposed for the next level. Generally, an M-channel filter bank should allow the M outputs to each be decimated by a factor of M, indicated by $\downarrow M$, without loss of information due to the effective partitioning of the spectrum into M portions by the filter bank.

Reconstruction of the original signal from the subband coefficients is possible if the proper synthesis filters are chosen, and the synthesis tree structure mirrors the analysis tree structure. FIG. 3a shows the simplest situation of decomposition of input s[n] into two subband coefficients, $y_1[n]$ and $y_2[n]$, by analysis filters $h_0$ and $h_1$ followed by reconstruction of (an approximate) ŝ[n] from the two subband coefficients with synthesis filters $g_0$ and $g_1$. FIG. 3b illustrates the same analysis and reconstruction with the inclusion of decimation by a factor of two, denoted $\downarrow 2$, in the decomposition plus compensating interpolation by 2, denoted by $\uparrow 2$, preceding the synthesis filters, $g_0$ and $g_1$, in the reconstruction. As an example, the JPEG2000 standard reversible 1 D transformation includes wavelet analysis filters $h_0$ for lowpass and $h_1$ for highpass with $h_0[0]=-\frac{1}{8}$, $h_0[1]=\frac{1}{4}$, $h_0[2]=\frac{3}{4}$, $h_0[3]=\frac{1}{4}$, $h_0[4]=-\frac{1}{8}$, and $h_1[0]=-\frac{1}{2}$, $h_1[1]=1$, $h_1[2]=-\frac{1}{2}$. The synthesis filters, $g_0$ and $g_1$, are simply phase shifts by $\pi$ of the $h_1$ and $h_0$, respectively. That is, $g_0[n]=(-1)^{n+1} h_1[n]$ and $g_1[n]=(-1)^n h_0[n]$.

More generally, the transformation of an input sequence x[n] by analysis filtering using a causal filter (kernel) $h_{ana}[n]$ followed by decimation by an integral factor M to yield coefficients in a subband has two steps:

$$z(m) = \sum_{k \le m} h_{ana}[m-k] \times [k] \quad (\text{convolution by } h_{ana}[n])$$

$$y[n] = z[nM] \quad (\text{decimation by } M)$$

These combine into a single convolution:

$$y[n] = \sum_{k \le nM} h_{ana}[nM-k] \times [k]$$

Typically, there would be M subbands, each with its own analysis filter.

Analogously, the general reconstruction has two steps: interpolation by an integral factor L followed by synthesis filtering with $h_{syn}[n]$:

$$z[m] = 0 \text{ when } m/L \text{ is not an integer}$$
$$= x[m/L] \text{ when } m/L \text{ is an integer (interpolation by } L)$$
$$y[n] = \sum_{m \le n} h_{syn}[n-m] z[m] \quad (\text{convolution by } h[n])$$
$$= \sum_{k \le floor(n/L)} h_{syn}[n-kL] z[kL]$$
$$= \sum_{k \le floor(n/L)} h_{syn}[n-kL] x[k]$$

Note that the summation limit floor(n/L) is largest integer not smaller than n/L; that is, the integer part of n/L. Again, with L subbands, there would be L different synthesis filters and the results of interpolation and filtering of each subband would be combined to form the final synthesized signal.

The reconstruction process requires use of all of the subband coefficients. However, in some applications, due to memory and computational constraints, it is desirable to reconstruct only select regions of the signal. For this to be done efficiently and effectively, a method for determining which subband coefficients are necessary for the reconstruction of an arbitrary data region of the synthesized signal is needed.

Conversely, in analysis applications, the original signal may be modified in certain regions. Instead of re-encoding the entire signal, it would be desirable to encode only the modified portion of the signal and replace the appropriate subband coefficients from the old analysis with the coefficients from the new analysis. A method for determining which subband coefficients refer to which parts of the input signal is required.

SUMMARY OF THE INVENTION

The present invention provides a method which translates from a desired output range in a filter bank synthesis/reconstruction to the required input subband range by a consideration of phases and/or translates from an input range to an analysis output range in subbands of a filter bank. Preferred embodiments include repeated application of the method to levels in a multilevel filter bank decomposition.

BRIEF DESCRIPTION OF THE DRAWINGS

The drawings are heuristic for clarity.
FIGS. 4–5 are examples of filtering.

DESCRIPTION OF THE PREFERRED EMBODIMENTS

1. Overview

Figure 1A:
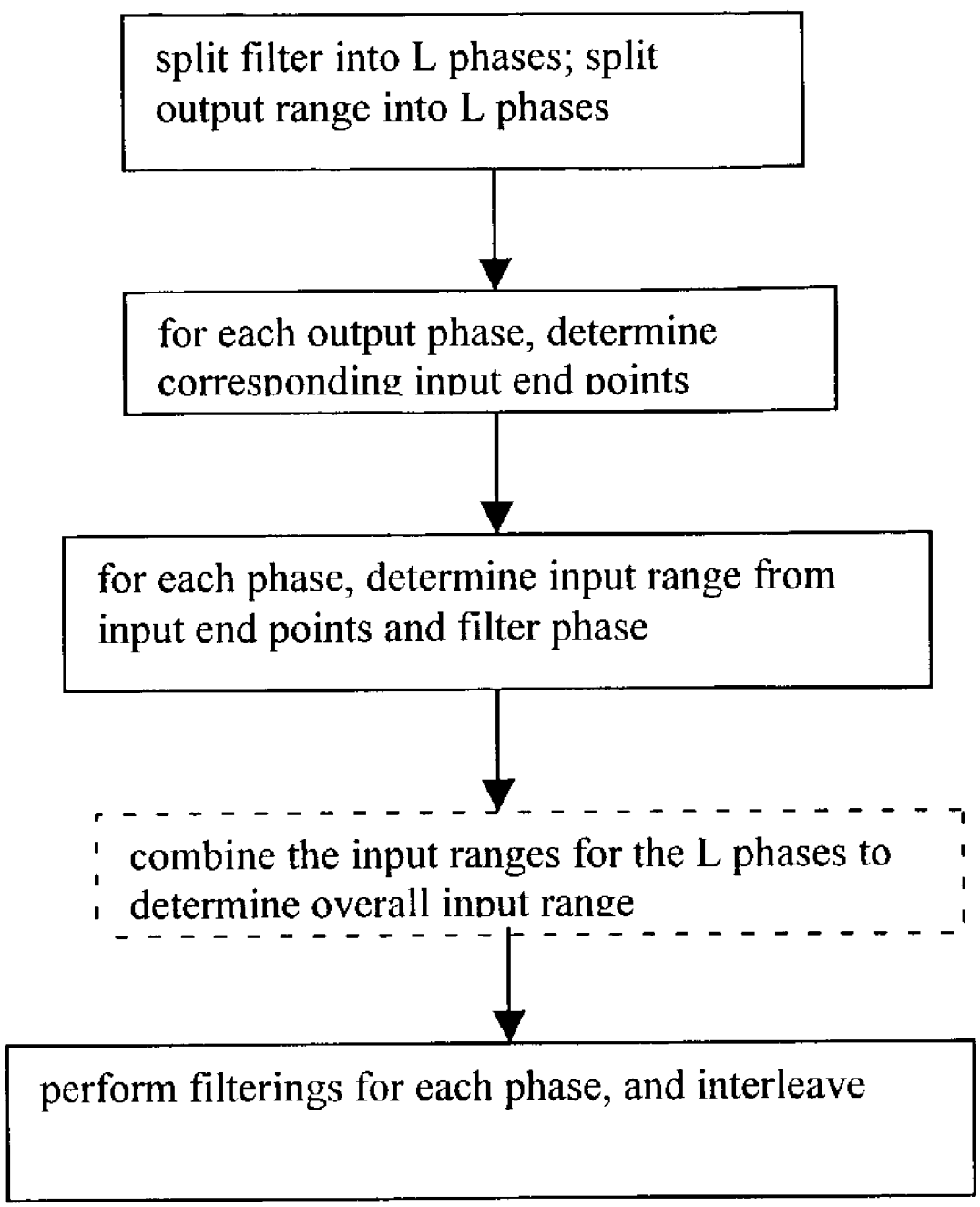
FIGS. 1a–1b are a flow diagram of a preferred embodiment range determination and tree repetition.

FIG. 1a illustrates the flow for a preferred embodiment method of reconstruction (synthesis) by interpolation/convolution for a given output range. For an interpolation by integer L, the method partitions the convolution filter into L phases and the output range into corresponding phases. Then for each phase, determine the input range and apply the corresponding convolution phase to generate the output phase; lastly interleave the output phases to yield the total output. In particular, with subband input x[k], output y[n], and convolution filter h[m], the interpolation/convolution is $$y[n] = \sum_{k \leq floor(n/L)} h[n - kL] \times [k]$$

where the causality of h[m] implies the upper limit of summation. The summation shows that only every $L^{th}$ component of h[m] is used for each n, and this defines the L phases of h[m] (denoted $h_0[m], h_1[m], h_2[m], \ldots, h_{L-1}[m]$) by setting $h_j[m]=h[mL+j]$.

Thus given an output index n with j=mod(n,L) (mod is the modulo function, so j≡n mod(L)), the interpolation/convolution becomes:

$$y[n] = \sum_{k \leq floor(n/L)} h_j[floor(n/L) - k] \times [k]$$

Changing variables in the sum yields;

$$y[n] = \sum_{0 \leq k} h_j[k] \times [floor(n/L) - k]$$

When h[.] is a finite impulse response (FIR) filter with zero coefficients for all values of the index greater than $N_h$, the $j^{th}$ filter phase $h_j[\ ]$ has zero coefficients for its index greater than some $N_j$ which is at most $N_h/L$. Thus the convolution sum is over at most the range $0 \leq k \leq N_h/L$. (The descriptions of the preferred embodiments in the following sections provide precise details.) This implies the range of input x[m] involved is at most $n/L - N_h/L \leq m \leq n/L$. Thus for an output y[n] range $a \leq n \leq b$, the corresponding inputs x[m] used lie within the range $a/L - N_h/L \leq m \leq b/L$. And for all outputs y[n] with mod(n,L)=j, only the $j^{th}$ filter phase $h_j[.]$ is used, so these outputs can be efficiently computed together and interleaved with the other output phases to form the final output.

Figure 1B:
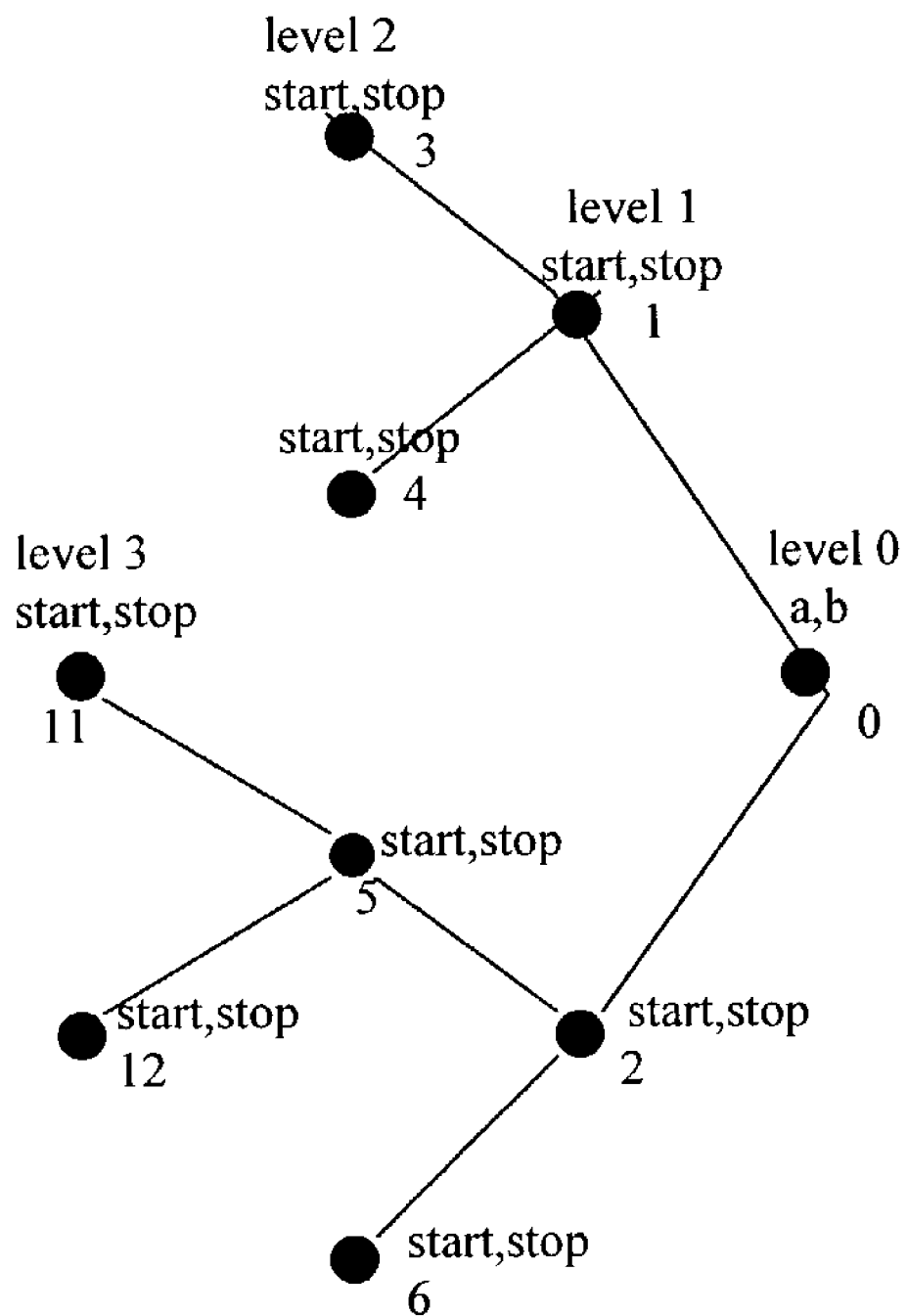
Figure 2A:
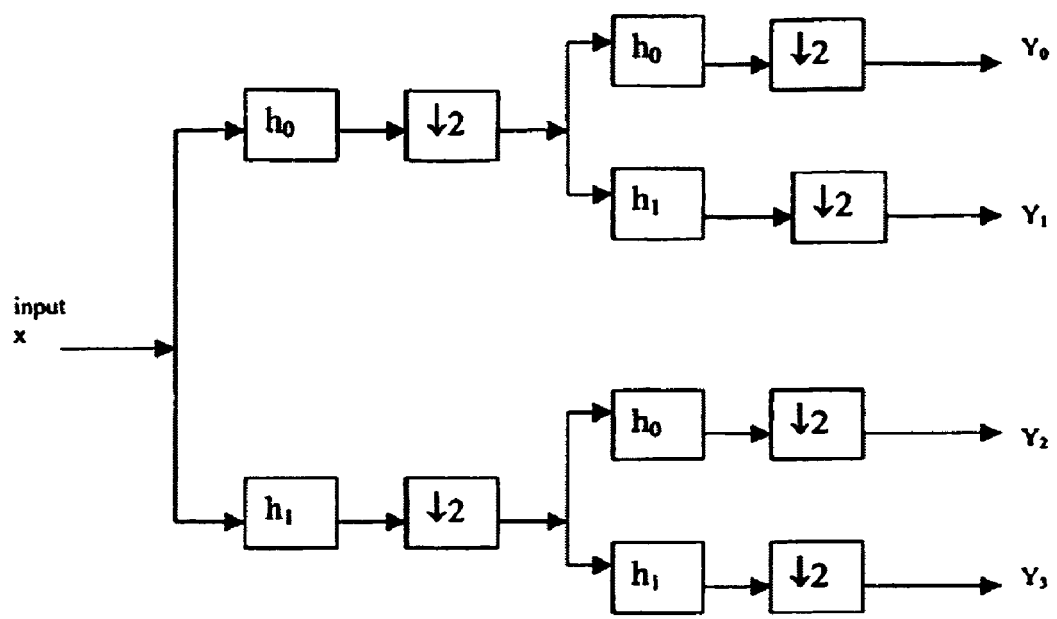
FIGS. 2a–2c illustrate decomposition trees.
Figure 2B:
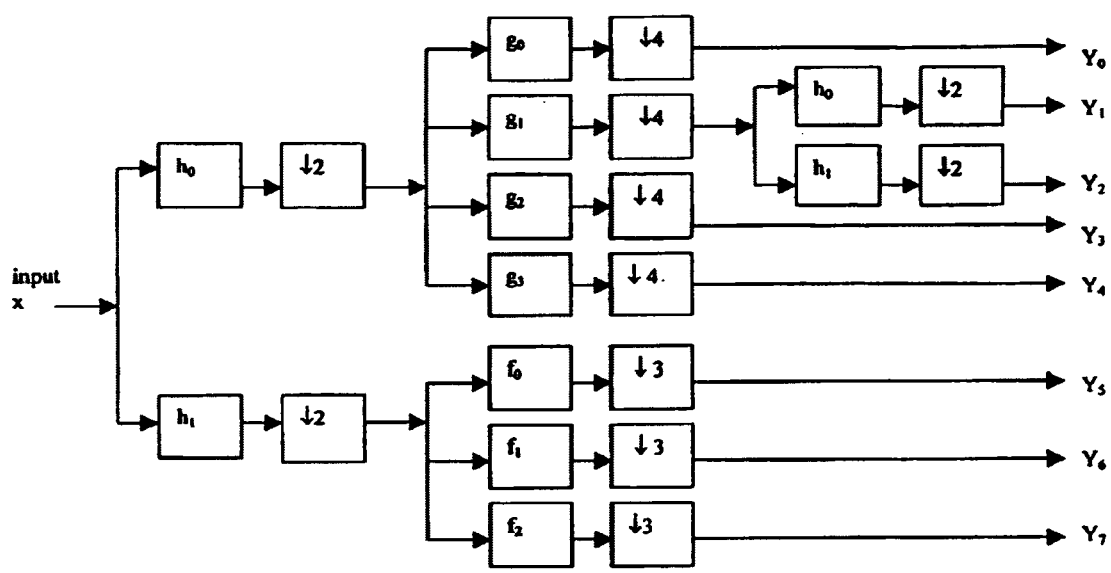
Figure 2C:
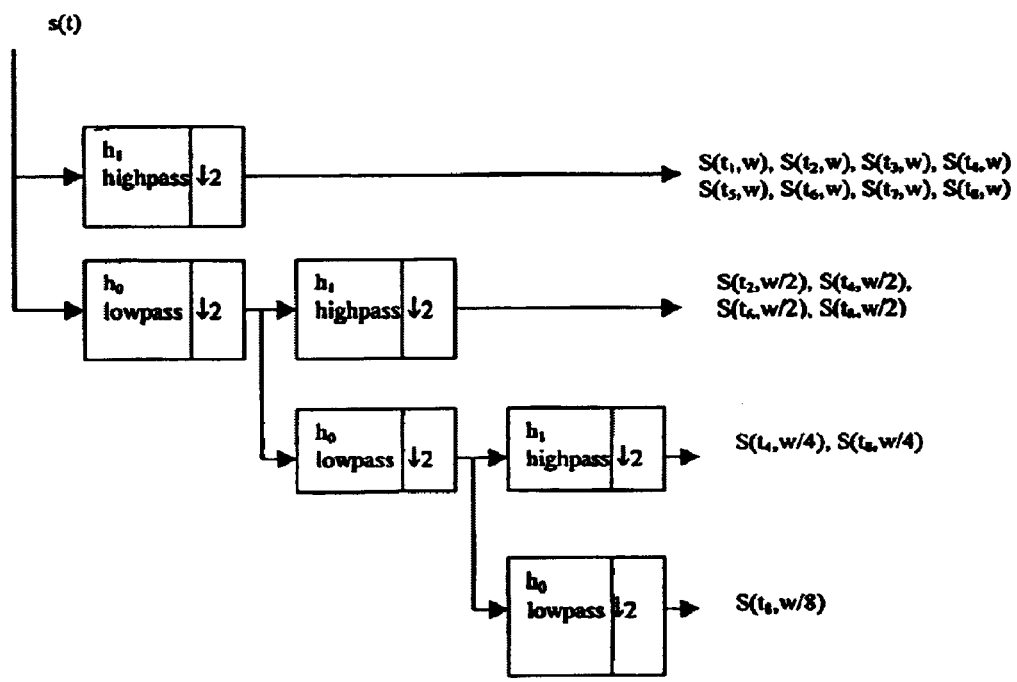
Figure 3A:
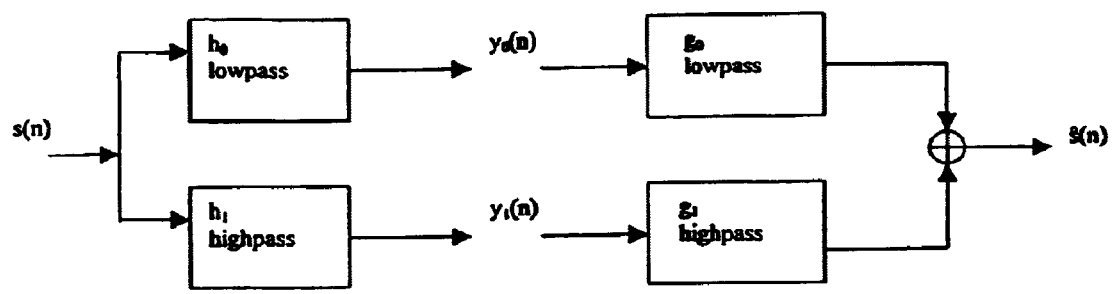
FIGS. 3a–3b show analysis and synthesis.
Figure 3B:
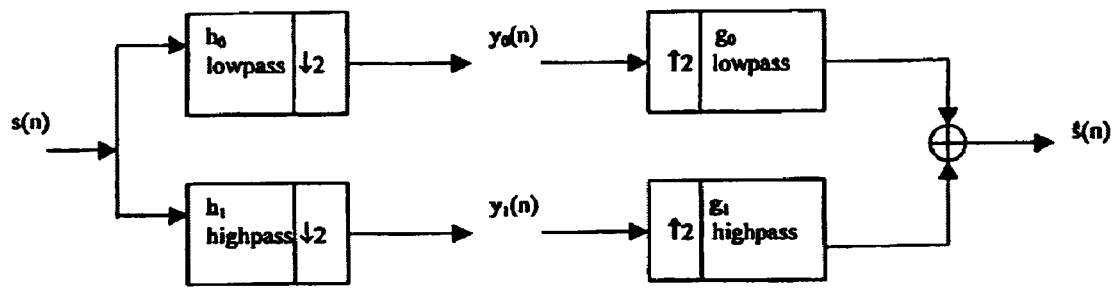

For reconstructions which involve multiple levels of subbands as illustrated in FIG. 1b, repeated use of the method from the final output level to the initial input levels determines the input ranges in terms of the desired final output range.

Analogously, the inverse operation determines the analysis filtering plus decimation index range in a subband arising from a given input data range, see section 6 below.

Of course, with causal analysis filters and causal synthesis filters the overall operation of analysis followed by synthesis (such as in real-time analysis into subbands, quantization in subbands, transmission, and then real-time dequantization and synthesis from subbands) will have an overall delay comparable to the sum of the lengths of the analysis and synthesis filters.

Preferred embodiment systems, such as video compression/decompression systems, include preferred embodiment hardware employing preferred embodiment methods. The computations can be performed with digital signal processors (DSPs) or general-purpose programmable processors or application specific circuitry (ASICs) or systems on a chip such as both a DSP, ASIC, and RISC processor on the same chip with the RISC processor controlling. Analog-to-digital converters and digital-to-analog converters provide coupling to the real world and may be integrated with the signal processors as a system-on-a-chip.

2. Interpolation by 2 Preferred Embodiments

The preferred embodiment methods observe that if only a portion of a signal is to be reconstructed, then all of the subband coefficients need not be used. Rather than initially considering arbitrary tree structures, first look at a simple example of convolution. Take the length of an input signal x[n] to be $N_x=10$ (e.g., only x[0], x[1], . . . , x[9] may be nonzero), and take the length of the filter h[n] to be $N_h=5$. Thus the convolution of x[n] and h[n] will yield y[n] with length, $N_y$, of at most 14:

$$y[n] = \sum_k h[n - k] \times [k]$$

where $0 \leq k \leq 9$ due to x[k] and $0 \leq n-k \leq 4$ due to h[n-k], imply $0 \leq n \leq 13$.

FIG. 4 is a graphical representation of the convolution. The first row shows the input signal. Each successive row shows the filter slide across the input. The left-most column shows the index number for the output signal. Each element in row i (not including the first row) gets multiplied by the same column element from row 1, and then accumulated across the row, as the convolution sum of products describes. From FIG. 4, it can be seen that this example requires 50 multiply-accumulate (MAC) operations to compute the entire output.

Now, to determine the output y[n] for only n=5–7 (shaded in gray in FIG. 4), simply refer to the figure to see which portion of the input signal is needed. In this case, only x[2], x[3], . . . , x[7] are required. The causality constraint on h[n] guarantees that there will be no need for any input samples that occur with index greater than the largest output index desired. In the particular example of FIG. 4, only 15 MAC operations are required to obtain the desired output.

Using FIG. 4, one can also find data regions where only portions of the filter are used because the input x[ ] is limited. For example, output indices 0–3 only require the first 4 taps (coefficients) of the filter. Likewise, output indices 11–13 only require the last 3 taps of the filter.

This graphical method can also be used to represent the two-step convolution plus decimation and the two-step interpolation plus convolution. Indeed, FIG. 5 is the graphical representation of the interpolation plus convolution where the interpolation is by a factor L=2 and the filter and input are the same as in the example of FIG. 4.

Including the interpolation operation in the graphical representation highlights some interesting points on polyphase filter implementation. By combining the interpolation with the convolution operation, the filter is essentially being divided into two phases: even and odd. The even-numbered rows only use even-numbered indices of the filter, and odd-numbered rows use the odd-numbered indices (the even rows are shaded in gray). Looking at only even or odd rows, FIG. 5 becomes identical to FIG. 4.

Therefore, for the implementation of the interpolation plus convolution, the preferred embodiment separates the filter into an even phase and an odd phase: $h_e[n]$ and $h_o[n]$. The interpolation plus convolution can then be split into two summations:

$$y[n] = \begin{cases} \sum_{0 \leq k \leq Nx-1} x[k] h_e[floor(n/2) - k] & \text{for even } n \\ \sum_{0 \leq k \leq Nx-1} x[k] h_o[floor(n/2) - k] & \text{for odd } n \end{cases}$$

where $N_x$ is the length of the input x[n] with x[0] the first nonzero coefficient, and as previously noted, floor(n/2) is the integer part of n/2.

In more detail, presume the following notation: a (subband) input x[n] of length $N_x$, a filter h[n] of length $N_h$ and split into even phase filter $h_e[n]$ and odd phase filter $h_o[n]$, $N_{h\_phases}$ a 2-component vector containing the lengths of the even and odd phase filters in order according to use, and a desired range $a \leq n \leq b$ for output y[n]. Then the preferred embodiment method for reconstructing of y[n] for $a \leq n \leq b$ using a single interpolation-by-2/convolution has the following steps.

0) Adjust indices to start at 0, so if a range is specified with indexing which begins at 1 (such as MATLAB), adjust the range endpoints to be a=a−1 and b=b−1; calculations are readjusted below for MATLAB indexing.

1) Calculate the maximal length of the output assuming complete computation: $2(N_x-1)+N_h$ (for general interpolation by L the length would be $L(N_x-1)+N_h$).

2) If the desired output range $a \leq n \leq b$ does not fall within the index range calculated in 1), EXIT with an error message.

3) Determine the phase order for the calculation. The starting of the output range 'a' will determine the position of the even and odd phase in the calculations. Define the 2-component vector Phase with the first component equal to the phase of 'a' and the second component to the phase of 'a'+1 where 0 denotes even phase and 1 denotes odd phase (even phase is [0 2 4 . . . ] and odd phase is [1 3 5 . . . ]). Expressed with MATLAB pseudocode the definition is:

Phase=mod(a+[0 1], 2);

4) Determine the required range for the input as follows. Let $N_{h\_phases}$ be a 2-component vector with the first component equal the length of the first filter phase and second component equal to the second filter phase where the phase order is specified in the vector Phase from step 3). For example, if Phase(1) equals 0 (even phase), then $N_{h\_phases}$(1) equals the length of the even filter phase $h_e[k]$. 'strt' (start) is a 2-component vector containing the start index of the input x[n] for each phase, again with phase order specified in the vector Phase from step 3), and similarly 'stp' (stop) is a 2-component vector containing the stop index of the input x[n] for each phase, phase order again specified in the vector Phase from step 3).

strt=max(0,((a+[0 1]−Phase)/2−Nh_phases+1)+1;

stp=min(Nx−1, floor(b/2)−min(1,max(0,phase−mod(b,2))))+1;

The '+1' at the end is to adjust for MATLAB indexing which starts with 1. Actually, the 'max' notation is to prevent a negative index and we use 'max(0, . . . ) for general indexing; MATLAB indexing is adjusted by the '+1' at the end. Note that strt(j)=1 when the length of the $j^{th}$ filter phase is larger than the corresponding a/2 or (a+1)/2 and thus the tail of the filter extends beyond the start of the data. Similarly, stp(j)=Nx−1 when the corresponding b/2 or (b−1)/2 is larger than the length of the input data and so the filter phase extends beyond the data. Step 6) makes adjustments for these conditions.

5) (Optional) Determine the required range for the filter; that is, make adjustments to a filter phase if either the filter phase has length larger than the stop index from step 4) (in which case the tail of the filter is never used and may be deleted) and/or the low end of the range is beyond the input data length (in which case the initial portion of the filter phase is never used and may be deleted). In most applications the entire filter will be used and these adjustments are not likely to add significant improvement; thus this step is optional.

6) Apply the convolutions with $h_e[.]$ and $h_o[.]$ to generate the even and odd phase output y[n] for the desired range $a \leq n \leq b$ using the required input x[.] ranges determined in step 4) (and, optionally, with the filter phases adjusted in step 5)). Convolution routines may apply zero-padding outside of a specified input range; thus the front and end tails of the convolution output needs to be chopped off for such convolutions.

7) Interleave the even and odd phases of y[n] to complete the output for the specified range. The relative position of even/odd phase is specified by vector Phase from step 3).

The following numerical example helps illustrate the method steps. Take $N_x$=100 (e.g., x[1], x[2], . . . , x[100] are nonzero), h[n] of length 9 split into even $h_e[n]$ and odd $h_o[n]$ with lengths $N_{he}$=5 and $N_{ho}$=4, and desired output range a=30, b=50. First, readjust range to 0-indexing: a=29, b=49.

Thus, the phase vector Phase=[1 0] (odd phase first) and so $N_{h\_phases}$=[4 5]

$$strt = \max(0, (29 + [0\ 1] - [1\ 0])/2 - [4\ 5] + 1) + 1$$

$$= [12\ 12] \text{ (the '}+1\text{' at the end readjusts to MATLAB index)}$$

$$stp = \min(99, \text{floor}(50/2) - \min(1, \max(0, [1\ 0] - \text{mod}(50, 2)))) + 1$$

$$= [25\ 25];$$

If the convolution includes a delay in the sense that $h_e[0]=h_e[1]=h_e[2]=$ . . . $=h_e[M_{he}]=0$ and $h_o[0]=h_o[1]=h_o[2]=$ . . . $=h_o[M_{ho}]=0$ with $M_{he}<N_{he}$ and $M_{ho}<N_{ho}$, then the upper endpoints of the input ranges, even_b and odd_b, are decreased to even_b−($M_{he}$+1) and odd_b−($M_{ho}$+1), respectively.

The preferred embodiment inverse operation of translating an input range [a,b] into an output range in each of the two analysis subbands (two analysis filterings followed by decimations by 2) has analogous behavior. Indeed, consider an input sequence x[n] with analysis filtering using a causal filter h[n] followed by decimation by 2 to yield output subband coefficients y[n]:

$$y[n] = \sum_{k \leq 2n} h[2n - k] \times [k]$$

Let $N_h$ be the length of h[m] and $N_x$ be the length of the input signal x[n], then the following possibilities for subband output range occur for the input range [a,b]:

I. $a=0$, $b \leq N_x$: y[n] for n in the range [0, floor(b/2)]

II. $0 < a \leq N_x$, $b=N_x$: y[n] for n in the range [floor($(a+N_h)/2$), floor($(b+N_h-1)/2$)]

III. $b-a+1 \geq N_h$: y[n] for n in the range [floor($(a+N_h)/2$), floor(b/2)]

Note that case III places a restriction on permissible input ranges. Case III may also contain legal input ranges, but produce illegal output ranges. For example, if $a=1$, $b=5$, and $N_h=5$, then the output range would be [3:2], which is clearly not possible (y[3] cannot come before y[2]). This occurs because the decimation operator actually completely wipes out this calculation.

Sections 6–7 below have a more general description and example.

3. Multiple Cascades of Two-channel Filter Banks Preferred Embodiments

The foregoing method can be extended to handle multiple cascades of the interpolation/convolution operation in any arbitrary tree structure. FIG. 1b shows an example of an arbitrary tree structure for the synthesis band of a two-channel filter bank.

To begin the extended method, each node of the tree should be assigned a number beginning with the output node assigned 0. The node number should be assigned assuming a full-tree structure. Node assignment helps in determining the relative position of child nodes to parent nodes. In the two-channel case, the depth of the tree is commonly referred to as its level. Level i contains $2^i$ nodes. Each node at level i is given a position number in the range from 0 to ($2^i-1$) and an ordered pair can be made ([level, position]). The node index can be calculated from the ordered pair by the following equation:

$$\text{NodeInd} = 2^{(level-1)} + \text{position}$$

The parent node can be found from the child node by the following equation:

$$\text{parent} = \text{round}(\text{child}/2-1)$$

This is why in FIG. 1b the deepest node pair has values 11 and 12 instead of 7 and 8 if only sequential nodes were labeled.

The ultimate objective is to translate the output range into the minimum range of coefficients at each terminal node. This is accomplished recursively by iterating the foregoing preferred embodiment method beginning at the output (node 0 in FIG. 1b) until a terminal node is reached. For example, if the desired output range is from a to b, then perform the foregoing method to find the minimum input range for the coefficient at nodes 1 and 2 (the ranges may be the same). Let the required range for nodes 1 and 2 be c to d. Nodes 1 and 2 are not terminal nodes, so repeat the method with nodes 3–6 as inputs with the desired output range c to d. Again, across each level, the ranges are identical, so the computation only needs to be performed once. Nodes 3, 4, and 6 are terminal nodes, so the method need only continue to calculate the ranges for terminal nodes 11 and 12 by another repeat.

4. Edge Effects Preferred Embodiments

Finite-length input signals require compensation for edge effects arising from the convolution filtering. Specifically, for the Wavelet Transform, finite-length input signals are typically extended (zero-padding, symmetric extensions, etc. . . . ) to eliminate edge effects in the filtering process. Filter banks using signal extensions require a modified version of the foregoing preferred embodiment methods due to the extension incrementing the signal index.

In particular, presume synthesis filtering with an interpolation by a factor of 2 (even and odd phases) and the input signal is extended by length ext defined as ext=len_odd+len_even−2 where len_odd and len_even are the lengths of the odd and even phases of the filter, respectively. This extension length together with the decimations of the analysis filterings affect the start and stop indices at each level of the synthesis tree; see FIG. 1b where the levels are vertical and increase from right to left.

As before, take [a,b] as the desired final output range (level 0), then at level i the start and stop indices for the synthesis filterings are:

start=max{0, ceiling($ext^*(2^{Nbands-i-1}-1)+a/2^i$)} stop=ceiling({$b+ext^*(2^{Nbands-1}-1)$}/$2^i$)

where ceiling(x) denotes the smallest integer not smaller than x, Nbands is the total number of subband levels, and the index is presumed to begin at 0 rather that at 1 as would be the case for MATLAB code. Intuitively, each of the two higher level subbands that are filtered (even and odd) and interleaved to form a lower level subband has an extension, and these two extensions are thus effectively interleaved. This translates to an index increment equal to 2 times the extension length of the lower level, and repeating over the levels gives the start and stop.

Then apply the previously-described preferred embodiment methods with the adjusted signal indices.

5. Preferred Embodiments with Interpolation by Factor Greater Than 2

The preferred embodiment methods with interpolation L greater than 2 are straightforward extensions of the foregoing preferred embodiment methods. In particular, take the L phases of h[.] (denoted $h_0[.]$, $h_1[.]$, . . . , $h_{L-1}[.]$) to have lengths $N_{h0}$, $N_{h1}$, . . . , $N_{h(L-1)}$ and to be used in convolutions with the phases of output index n defined by mod(n,L). Thus for the desired output range [a:b], the first phase is mod(a,L), and the convolutions for output indices with this phase use the filter phase $h_{mod(a,L)}[k]=h[kL+mod(a,L)]$. In particular:

1) If needed, adjust the range for 0-indexing: range=[a−1:b−1]

2) Calculate the phase order (vector Phase) where 'rng' is the two-component vector with first component the low end of the output range and the second component the high end of the output range:

Phase=mod(rng(1)+[0:L−1],L)

Filter phases are ordered according the vector Phase; and the filter phase lengths are put in the vector Nh_phases, again with order according to Phase.

3) Calculate start (strt) and stop (stp) indices of the input for each phase and put together as two L-component vectors.

strt=max(0,(rng(1)+[0:L−1]−phase)/L−Nh_phases+1)+1;

stp=min(Nx−1, floor(rng(2)/L)−min(1,max(0,phase−mod(rng(2),L))))+1;

This is vectorized code, so strt and stp are L-component vectors ordered by phase; that is, strt(j)≤k≤stp(j) is the range of x[k] used in the $j^{th}$ phase convolution using the $j^{th}$ filter phase.

4) The union (over the phases) of these input ranges is then the overall required input range. And for each filter phase, use the corresponding input range to compute the corresponding output phase y[n]s. Then interleave the y[n]s to complete the output; see FIG. 1a.

For a deeper tree (e.g., FIG. 1b), repeat with the appropriate L at each node.

6. Analysis Subband Index Preferred Embodiments

In analysis filtering (decomposition into subbands), decimators replace interpolators, and the preferred embodiments reflect this. Instead of creating even and odd phases of the (synthesis) filter, even and odd phases of the input signal are created. Also, analysis moves along the tree in a different direction than synthesis.

In particular, preferred embodiments compute the output index range in one of M subbands that results from analysis filtering of a given input range followed with decimation by M. Indeed, with causal filtering plus decimation by M, an input index range $a^* \leq n \leq b^*$ influences the output range of roughly $a^*/M + (N_j - 1)/M \leq m \leq b^*/M$ in the $j^{th}$ subband where $N_j$ is the length of the $j^{th}$ subband analysis filter. More precisely, the decimation by M implies that only every $M^{th}$ filtering with the $j^{th}$ filter needs be computed. Thus the first subband coefficient which includes $a^*$ in its filtering has index floor($a^*/M + K_j/M$), except when $a = 0$, in which case the first subband coefficient which includes $a^*$ in its filtering has index 0. Similarly, the last subband coefficient which includes $b^*$ in its filtering has index floor($b^*/M$), except when $b = N_x$, in which case the last subband coefficient which includes $b^*$ in its filtering has index floor($b^*/M + (K_j - 1)/M$). Here $K_j$ denotes the length of the analysis filter for the $j^{th}$ subband, $N_x$ denotes the length of the input, ceiling(z) denotes the smallest integer greater than or equal to z, and floor(z) denotes the largest integer not greater than z. Also as previously described, if the data is extended, then the subband index may also be extended.

Use of this analysis index preferred embodiment typically occurs together with a determination of the corresponding synthesis index range as in the following problem: a data set with index range [0, R] has been compressed by analysis filtering with M passband filters and each filtering decimated by M to yield coefficients in M subbands, each subband with index range [0, R/M]. But now a change of the input data in the range [a, b] is made, and two questions arise: (1) what subband coefficients need to be changed to reflect this data change, and (2) what range of input data are used to make these subband changes presuming use of the analysis filtering and decimation. For the first question, apply a previously-described preferred embodiment method to determine which subband coefficients are needed to synthesize [a, b]; these will be the coefficients which require change. Denote this coefficient index range in the jth subband as [jay_a, jay_b]. As previously described, the range [jay_a, jay_b] is roughly [a/L−($N_j$−1), b/L] when the $j^{th}$ phase filter has length $N_j$ and the interpolation is by L. Of course, here L=M.

Then the second question becomes, what input data range $[a^*, b^*]$ is needed to compute [jay_a, jay_b] for all j; this uses the analysis index preferred embodiment of the preceding paragraphs. Roughly, $[a^*, b^*]$ are used to compute $[a^*/M + K_j/M, b^*/M]$ in the $j^{th}$ subband with an analysis filter of length $K_j$. Hence, determine $a^*$ and $b^*$ by equations: L=M, $a^*/M = a/L − (N−1)/L$, and $b^*/M = b/L$ where N is the largest $N_j$ and K is the largest $K_j$. Thus roughly $a^* = a − N + 1$ and $b^* = b + K − 1$; that is to edit [a, b] involves recomputing subband coefficients using data in [a−N+1, b+K−1]. The preferred embodiments are more precise and use the floor(x) and ceiling(x) versions in the computations and accommodate for data extensions.

7. Alternative Analysis Preferred Embodiment.

A further preferred embodiment method calculates the input range given subband output range (L-bands) as follows (expressed in MATLAB pseudocode):

1) Output Range is specified: rng=[a:b]
2) Adjust Range for zero-indexing a=a−1, b=b−1
3) Check if specified Range is Valid
   If b>round((Nx+Nh−1)/L) EXIT
4) Divide Input into L-phases
   x_phases{i}=x(i:L:end) i=[1, 2, . . . L]
   Nx_phases(i)=length(x_phases{i})
5) Divide Filter into L phases
   h_phases{1}=h(1:L:end)
   for i=L:-1:2
      h_phases{L−i+2}=h(i:L:end) end Note the phase order for filter is reversed compared to input phase order
6) Calculate Total Input range
   Strt=max(0,rng(1)*L−Nh+1);
   Stp=min(Nx−1,rng(2)*L);
7) Calculate Phase order
   phase=mod(strt+[0:L−1], L);
8) Calculate strt/stp indx for each phase
   strt_idx=max(0,floor((Strt+[0:L−1])/L));
   stp_idx=floor((stp−[0:L−1])/L);
      stp_idx must be reordered to match the same phase order of strt_idx
      stp_phase=mod(stp−[0:L−1],L);
      Permutate stp_phase to match phase vector; use same permutation to reorder stp_idx
9) Correct for MATLAB indexing
   strt_idx=strt_idx+1;
   stp_idx=stp_idx+1;
10) Perform convolution for each phase and add results to get output. As with the synthesis, the 'tails' of the convolution must be truncated appropriately 8. Modifications The preferred embodiments can be varied while retaining one or more of the features of translating synthesis output ranges into input ranges by consideration of filter phases and phased convolutions and/or translating analysis input ranges into output ranges.

For example, a filter could be non-causal so the index computations then involve both a causal length $N_{causal}$ (length of $h_j[n]$ for positive n) and a noncausal length $N_{noncausal}$ (length of $h_j[n]$ for negative n) for the $j^{th}$ phase filter with the output range [a,b] roughly translating (for interpolation by L) into the input range $a/L − N_{causal}/L < m < b/L + N_{noncausal}/L$. For a filter symmetric about 0 (for nonzero n: $h[-n]=h[n]$) the lengths are equal: $N_{causal}=N_{noncausal}$.

What is claimed is:

1. A method of filtering, comprising:
   (a) determining a plurality of phases of a filter;
   (b) translating an output range of an output index into a plurality of possibly-overlapping input ranges of an input index, one of said input ranges for each of said phases;
   (c) applying each of said phases to filter an input signal within said input ranges; and
   (d) interleaving the results of step (c) to form an output signal with index in said output range.

2. The method of claim 1, wherein:
(a) said translating of step (b) of claim 1 includes adjusting the input ranges for the lengths of said phases.

3. The method of claim 1, wherein:
(a) said translating of step (b) of claim 1 includes adjusting the input ranges for extensions of said input signal.

4. The method of claim 1, wherein:
(a) said plurality of phases consists of an even phase and an odd phase.

5. The method of claim 1, further comprising:
(a) repeating said step (b) to translate said input ranges into higher level input ranges; and
(b) applying each of said phases to filter an input signal within said higher level input ranges to form signals in said input ranges; and
(c) interleaving the results of step (b) to form signals with indices in said input ranges.

6. The method of claim 1, wherein:
(a) said plurality of phases consists of L phases where L is an integer greater than 1 and the jth filter phase equals the components of a parent filter with indices equal to j modulo L.

7. A method of modifying a filter output signal, comprising:
(a) providing an output signal in a first output index range, said output signal a filter output of an input signal in a first input index range;
(b) translating a second input index range into a second output index range, where said second input index range is less than all said first index range and said second output index range is less than all said first output index range;
(c) filtering a second input signal within said second input index range; and
(d) modifying said output signal with the results of step (c) in said second output index range.

* * * * *

UNITED STATES PATENT AND TRADEMARK OFFICE
CERTIFICATE OF CORRECTION

PATENT NO. : 7,039,665 B2 Page 1 of 1
APPLICATION NO. : 10/259676
DATED : May 2, 2006
INVENTOR(S) : Daniel L. Zelazo and Steven D. Trautmann It is certified that error appears in the above-identified patent and that said Letters Patent is hereby corrected as shown below:

Title page, Item (75), please amend as follows:
Daniel L. Zelazo, Kasiwa (JP); Steven D. ~~Trautman~~ Trautmann, Tsukuba (JP)

Signed and Sealed this

Eighteenth Day of July, 2006

JON W. DUDAS
*Director of the United States Patent and Trademark Office*